June 27, 1944.  R. A. BAILEY  2,352,308
LATERAL CONTROL SYSTEM FOR AIRCRAFTS
Filed Dec. 23, 1940
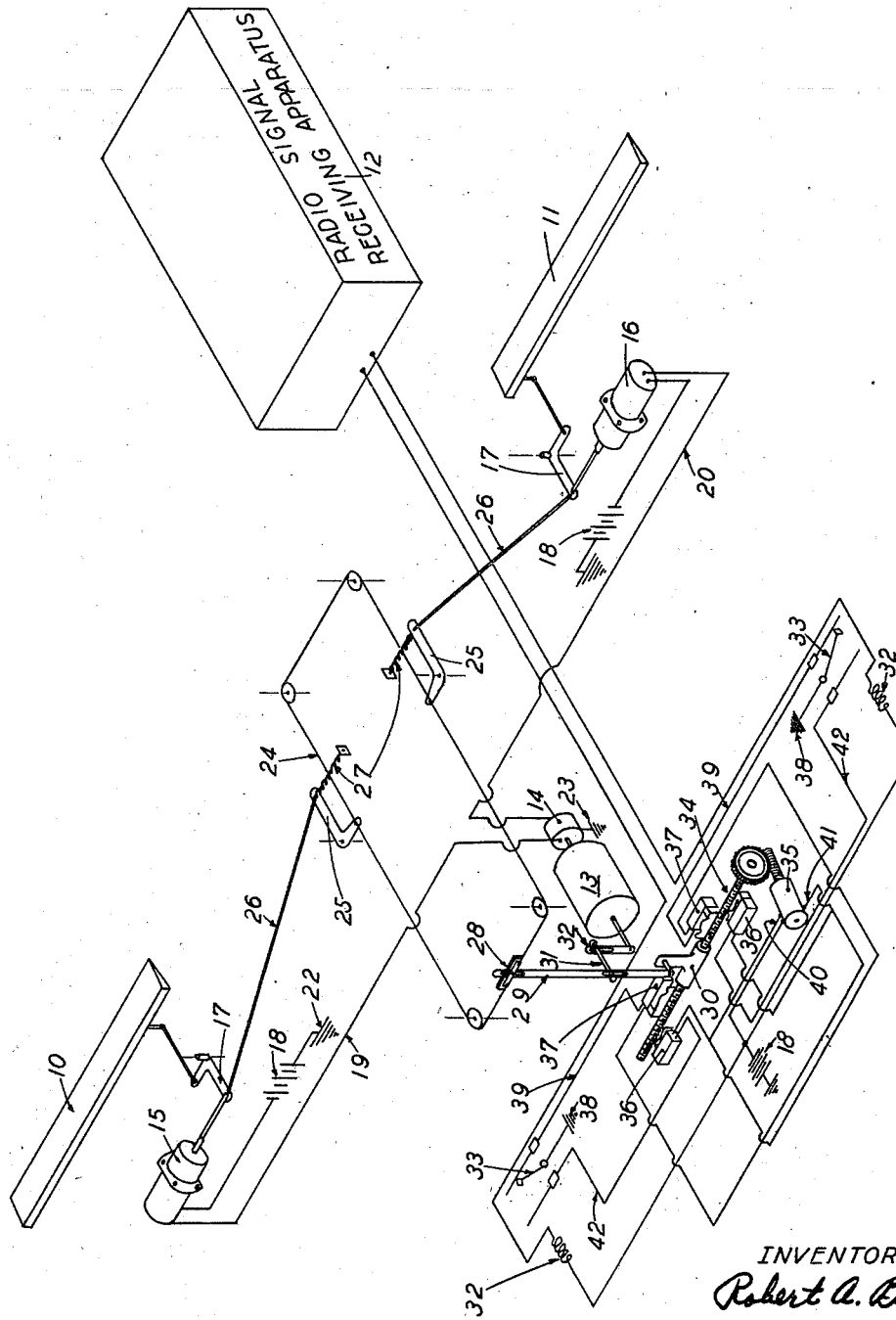
INVENTOR
Robert A. Bailey Patented June 27, 1944

2,352,308

UNITED STATES PATENT OFFICE 2,352,308

LATERAL CONTROL SYSTEM FOR AIRCRAFT

Robert A. Bailey, Burbank, Calif., assignor, by mesne assignments, to Lockheed Aircraft Corporation, a corporation of California Application December 23, 1940, Serial No. 371,274

3 Claims. (Cl. 244—14)

This invention relates to an improved and simplified lateral control system for aircraft, and has special reference to a lateral or aileron control particularly adapted for use in connection with remotely controlled airplanes wherein a ground operator or observer manipulates the airplane controls by means of radio signals.

Radio or remotely controlled airplanes have been proposed and under development for some time, and usually embody lateral, elevating and steering control mechanisms energized by relays closed by radio signals given by a radio sending set controlled by a ground operator, whose control signals must necessarily be based on visual observation of the distant airplane. Since the distant airplane may be barely visible it would be difficult to estimate its lateral trim in advance of movements resulting from changes therein so that ground adjustments of the lateral control are difficult to make and require a three dimensional control system. By providing a lateral control hooked up to the general principle of a gyro-horizon, I have found that a simplified and improved automatic lateral control can be obtained in connection with a constant angle of bank, when a turn is desired, thus in effect changing the ground control to a two dimensional system, since the constant bank control can be simplified to an on and off control not requiring a range of adjustments in response to controlled radio signals.

It is accordingly an object of this invention to provide an improved and simplified automatic lateral control especially suitable for a radio controlled airplane, thus relieving ground station operators of the necessity of lateral control.

It is a further object of this invention to provide an improved and simplified lateral control in combination with a constant angle of bank in response to radio signals whereby a constant rate of turn can be obtained during the period the turn signal is being transmitted, with an automatic return to level flight conditions upon cessation of the radio signal.

It is another object of this invention to provide an automatic control for remotely controlled robot mechanisms wherein a gyroscope is adapted to initiate a corrective servo control the operation of which acts through a follow up to restore the gyroscopic control to a neutral position, in turn releasing the corrective control and re-energizing the gyroscopic control; thus producing a series of diminishing impulses in the servo control until the desired conditions of stability are attained.

Other and further important objects of this invention will be apparent from the disclosures in the specification and the accompanying drawing.

This invention in its preferred form is illustrated in the drawing and hereinafter more fully described.

The drawing, illustrating an application of this invention to the lateral control of a robot airplane, comprises a single diagrammatic assembly of an aileron control and its actuating mechanism, together with a wiring diagram therefor.

The invention is shown in connection with the ailerons 10 and 11 of an airplane intended to be controlled from the ground by radio signals received by suitable receiving apparatus generally indicated by the numeral 12. The details of the receiving apparatus form no part of my invention. For the purposes of this invention the radio signal receiving apparatus is energized when it is desired to bank the airplane for a turn, the gyroscope controlling the lateral trim of the airplane at all times and having the banking control imposed thereon only when the radio receiving set is suitably energized by the operator of the complementary sending apparatus, which may be located on the ground or in another airplane.

The ailerons 10 and 11 are arranged to be operated by solenoids 15 and 16 respectively, which act through bell cranks 17 to move the ailerons. The solenoids are energized from a battery 18 by circuits 19 and 20 to the gyro controlled switch 14, one terminal of the battery being grounded at 22 while the switch 14 is also grounded at 23. While separate batteries are shown, this is merely to avoid complication of the wiring diagram, so that a common reference character is used.

The ailerons 10 and 11 are indirectly interconnected by a closed cable system 24 having bell crank connections 25 to rods 26 linked to the solenoids. Springs 27 serve to return the system to neutral when the solenoids are not energized. The cable system 24 is connected to a traversely movable stud 28 which acts as an upper fulcrum for a lever 29 about a rider 30 to be described hereinafter. Intermediate its length the lever 29 engages a stud 31 carried by an arm 32 movable with the gyroscope case 13, which is free to pivot about its axis. In fact the gyroscope or gyrohorizon remains stationary in space while the airplane and the gyro case turns about it, but it will be easier to understand if reference is made to the gyro turning towards the observer when the right wing of the airplane dips down. According to the solenoid and aileron operating linkage, the gyro controlled switch may be arranged to energize one solenoid to turn its aileron down or the other to turn its aileron up, the linkage shown being such that the left solenoid is energized to turn the left aileron 11 up with a corresponding opposite motion of the right aileron 10 through the cable system 24. At the same time, the cable system moves the upper end of the lever towards the high side of the plane to restore the gyro case 13 and switch 14 to their neutral position relative to the gyroscope, thus de-energizing the solenoid and allowing the springs 27 to restore the ailerons to neutral, whereupon the return of the cable system 24 and lever 29 to neutral again rotates the gyroscope case with respect to the gyro which, in turn, re-energizes the solenoid if the airplane has not entirely recovered its level flight condition.

Continued application of this cycle produces a flickering action by the ailerons, and each aileron flick produces a rolling movement tending to return the airplane to lateral trim. Hence it will be seen that the magnitude of these flicks decreases in size as the airplane approaches lateral trim thereby decreasing a rolling movement due to aileron deflection. It is in this way that overcontrol is prevented and rolling motions are damped out.

The length of the lever 29 and the relative position of the three studs are so proportioned that the flicking action of the ailerons occurs for any lateral displacement of the wings up to an angle of 10 degrees. For any angle beyond that, full aileron deflection occurs and is held until the airplane returns to within 10 degrees of lateral trim. At that point the flicking action commences and decreases in magnitude as lateral trim is approached. It can be seen then, that violent rolling disturbances are corrected for by application of full control and minor or gentle rolls corrected for by a more gentle flicking action of the ailerons.

The operation of the constant bank feature of this system is as follows: If the ground station operator wishes to bank the airplane to the right, for example, he transmits to the airplane a radio signal which, through relays, runs the motor control unit 35 operating through a lead screw 34 to displace rider 30 to the left. This, it will be seen, tilts the bottom of lever arm 29 to the left also and rotates the gyro case 13 away from its original position. The switch 14 then actuates the solenoid in the right wing which acts to lower the left aileron and raise the right aileron. This control movement returns the gyro case 13 back toward its original position, and we see that a flicking aileron action is set up which tends to roll the airplane to the right. This flicking action continues until the airplane assumes the angle of bank for which the apparatus is set and will maintain this position as long as the radio signal for right bank is maintained. Any attempt on the part of the airplane to increase the bank or decrease the bank will be met with the same control action as described previously (which tends to keep the wings level during straight line flight). As soon as the pilot again desires to fly a straight line, he merely discontinues the radio command for right bank and the motor control unit 35, which is a homing unit, will immediately return rider 30 to the neutral position. Aileron control action is then removed or reversed until the wings again become level.

The value of this angle of constant bank may be adjusted to whatever value is desired by merely increasing or decreasing the travel of rider 30 on its lead screw 34 or by varying the proportion of the linkages of lever 29.

The value of the follow-up or damping action of the system may be varied to an angle greater or smaller than 10 degrees by increasing or decreasing the travel of the control cable 24 or similarly by changing proportions of linkage of lever 29.

The rider 30, previously referred to, normally serves as the lower fulcrum for the lever 29, but is adjustable sideways to produce bank in either direction to energize the lateral controls by angular displacement of the gyroscope case, thus energizing the aileron solenoids in the same way as before to produce a condition wherein the neutral position of the gyro-horizon will correspond to a constant angle of bank of the airplane, dependent upon the sideways travel of the rider 30. Thus banking signals fulcrum the lever 29 about its upper fulcrum stud 28, while movements of the ailerons pivot the lever 29 about the rider 30.

The sidewise adjustment of the rider 30 is intended to be accomplished by signals transmitted to the radio receiving apparatus 12, separate signals energizing solenoids 32 which operate relays 33 for banking right or left. To this end the rider 30 is mounted on a threaded shaft 34 driven by a reversible motor 35, one terminal of which is connected to the battery 18. A pair of normally closed limit switches 36 are mechanically opened by the rider 30 at either extreme of its motion; and a pair of normally open centering switches 37 are positioned on either side of the rider 30 in its central position, these switches being connected with the limit switches in such a way that as the rider 30 is driven past center in one direction it will close the centering switch on the other side to reverse the drive until the rider comes to rest between the centering switches. The effect is to produce a homing or self-centering control which can be held offset to one side as long as the radio signal is energized, but returns to center position as soon as the signal is discontinued.

To accomplish this result, the wiring is arranged so that when the relays 33 are in the position shown, the centering switches 37 hold circuits open between a ground 38 at the relays which normally make contact with separate lines 39 to the switches 37. Other lines 40 and 41 extend to terminals on the motor, the arrangement being such that when the left hand switch 37 closes its circuit the motor drives the rider to the right, and the right hand switch energizes the motor to drive the rider to the left.

When the operator desires to throw the airplane into a bank he sends the desired signal which the receiving set 12 converts into a ground for energizing one of the solenoids 32 to shift its associated relay 33 to ground a connection 42 to one of the normally closed limit switches 36, which switches are so connected as to drive the rider 30 towards the switch that is energized by the relay. Thus as long as the radio signal is received the rider will be held at one or the other extreme of its travel, at which it opens the corresponding limit switch 36; and upon cessation of the signal the relay is released, to return to its normal position, and the centering switch 37, which is held closed by the offset rider, causes the latter to return to its central position wherein both switches 37 are open.

When the rider 30 is held at one extreme of its travel it acts to swing the lever 29 to rotate the gyroscope case in such a manner as to energize the switch 14 for the solenoid in the wing that is to be lowered. For a right bank, the solenoid in the right wing acts to raise the right aileron and lower the left aileron. This control movement acts through the cable 24 to return the gyro case 13 to its neutral position, producing a recurring flickering action of the ailerons until the designed angle of bank is obtained, which position will be maintained as long as the radio signal is continued to hold the rider 30 at its extreme position, any variation from the designed angle of bank being met by the normal lateral control previously described. Upon discontinuation of the banking signal, the rider 30 returns to its central position, and the aileron control action is reversed until the airplane is restored to its level flying attitude.

The combination of the constant bank control with the automatic lateral control is especially applicable to remotely controlled or robot airplanes, but is obviously readily adaptable to other uses outside of aviation. The system can also be used with large airplanes which require booster or servo controls, because of the forces required to actuate large control surfaces at high speed, since a pilot's control can be readily substituted for the radio signal receiving apparatus required for a robot or remote control.

It will thus be seen that I have invented an improved and simplified automatic lateral control for airplanes that can be remotely controlled to produce and maintain a constant angle of bank at the will of a distant operator.

Having thus described my invention and the present preferred embodiments thereof, I desire to emphasize the fact that many modifications may be resorted to in a manner limited only by a just interpretation of the following claims.

I claim:

1. A lateral control for an airplane comprising a pair of spaced ailerons arranged with interconnected linkages adapted to produce simultaneous and opposite deflections, separate solenoids each arranged for one-way operation of one of said ailerons and to simultaneously operate the other aileron in an opposite direction by means of said interconnected linkage, a source of electrical energy for said solenoids, a gyro, a switch controlled by the gyro to energize one or the other of said solenoids in response to changes in lateral trim of said airplane, a follow-up linkage associated with the interconnected aileron linkage and the gyro controlling said switch, said follow up linkage including a lever connected at one end to the follow up linkage and normally pivoting about its other end, the gyro being connected to said lever intermediate its ends in such a manner as to restore said gyro controlled switch to its neutral position upon movement of said follow up linkage upon energization of either solenoid by said switch, a remotely controlled radio receiving set, and means for laterally shifting the normal pivot point of said lever in response to electrical impulses from said remotely controlled radio receiving set, whereby the lateral shifting of the lever pivot is adapted to produce a constant angle of bank in said gyro controlled aileron control system.

2. A lateral control for an airplane comprising a pair of spaced ailerons arranged with interconnected linkages adapted to produce simultaneous and opposite deflections, separate solenoids each arranged for one-way operation of one of said ailerons and to simultaneously operate the other aileron in an opposite direction by means of said interconnected linkage, a source of electrical energy for said solenoids, a gyro, a switch controlled by the gyro to energize one or the other of said solenoids in response to changes in lateral trim of said airplane, a follow up linkage associated with the interconnected aileron linkage and the gyro controlling said switch, said follow-up linkage including a lever connected at one end to the follow up linkage and normally pivoting about its other end, the gyro being connected to said lever intermediate its ends in such a manner as to restore said gyro controlled switch to its neutral position upon movement of said follow up linkage upon energization of either solenoid by said switch, whereby the solenoids are adapted to deflect the ailerons to a predetermined degree in response to an impulse from the gyro controlled switch, and the follow up linkage is adapted to restore the ailerons to their neutral positions, thus restoring lateral trim by a series of predetermined impulses delivered to the ailerons.

3. A lateral control for airplanes embodying a gyro control and a superimposed radio control for producing a constant angle of bank at will, comprising a pair of spaced ailerons arranged with interconnected linkages adapted to produce simultaneous and opposite deflections, separate solenoids each arranged for one-way operation of one of said ailerons and to simultaneously operate the other aileron in an opposite direction by means of said interconnected linkage, a source of electrical energy for said solenoids, a gyro, a switch controlled by the gyro to energize one or the other of said solenoids in response to changes in lateral trim of said airplane, a follow-up linkage associated with the interconnected aileron linkage and the gyro controlling said switch, said follow up linkage including a lever connected at one end to the follow up linkage and normally pivoting about its other end, the gyro being connected to said lever intermediate its ends in such a manner as to restore said gyro controlled switch to its neutral position upon movement of said follow-up linkage upon energization of either solenoid by said switch, whereby the solenoids are adapted to deflect the ailerons to a predetermined degree in response to an impulse from the gyro controlled switch, and the follow up linkage is adapted to restore the ailerons to their neutral positions, thus restoring lateral trim by a series of predetermined aileron deflections, a remotely controlled radio receiving set, and means for laterally shifting the normal pivot point of said lever in response to electrical impulses from said remotely controlled radio receiving set, whereby the lateral shifting of the lever pivot is adapted to produce a constant angle of bank in said gyro controlled aileron control system.

ROBERT A. BAILEY.